No. 861,963. PATENTED JULY 30, 1907.
R. FYFE.
INSECT DESTROYER.
APPLICATION FILED MAY 3, 1907.
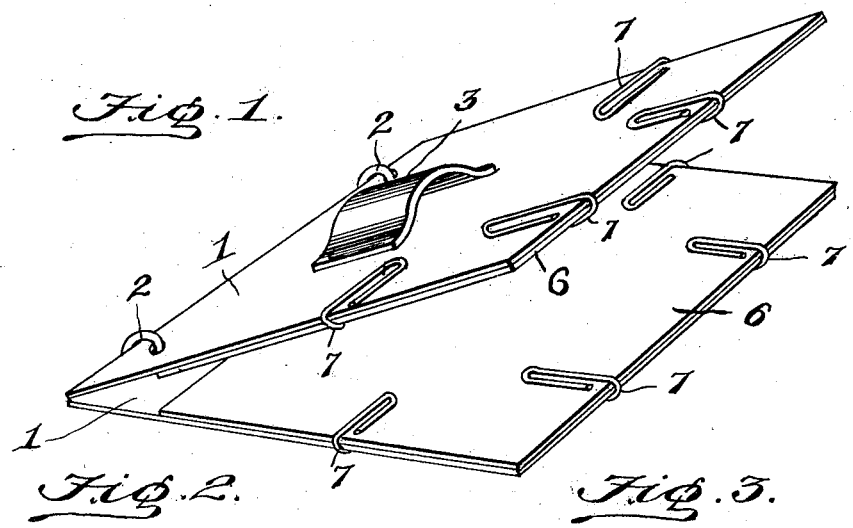
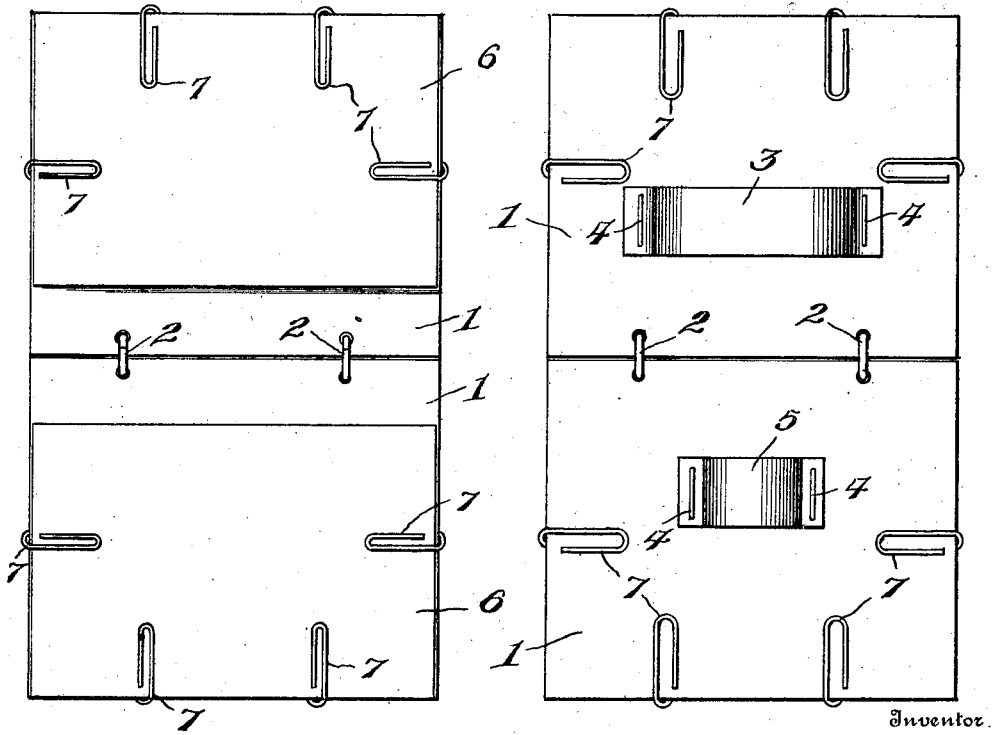
Witnesses
Inventor
Robert Fyfe,
By Victor J. Evans
Attorney

UNITED STATES PATENT OFFICE.

ROBERT FYFE, OF ST. LOUIS, MISSOURI.

INSECT-DESTROYER.

No. 861,963.  Specification of Letters Patent.  Patented July 30, 1907.

Application filed May 3, 1907. Serial No. 371,614.

*To all whom it may concern:*

Be it known that I, ROBERT FYFE, a citizen of the United States, residing at St. Louis, State of Missouri, have invented new and useful Improvements in Insect-Destroyers, of which the following is a specification.

This invention relates to insect destroyers, and one of the principal objects of the same is to provide a device of simple construction to be attached to the hand of the user for killing flies, mosquitos and other insects flying through the air.

Another object of the device is to provide an insect destroyer comprising two pieces of card board or other flat sheet material hinged together and provided with finger loops for connecting the device to the hand of the user, the device being used for catching flies and killing them between the two members of the device.

Still another object of the invention is to provide an insect destroyer of the character referred to, in which the contacting surfaces of the two members may be readily renewed by attaching separate strips of paper or card board thereto by suitable clips or clasps.

These and other objects may be attained by means of the construction illustrated in the accompanying drawing, in which:

Figure 1 is a perspective view of an insect destroyer made in accordance with my invention, the two members being shown partially open. Fig. 2 is a plan view of the inside of the device. Fig. 3 is a plan view of the outside of the device.

Referring to the drawing for a more particular description of my invention, the numerals 1 designate the two members of the insect destroyer. These two members may be conveniently made of card board, aluminium, tin or other light sheet material, and said two members are connected together by a suitable hinge, or hinges 2. Connected to the outer side of one of the members 1 is a finger strap 3, said strap being connected to the member 1 by means of wire staples or stitches 4. Connected to the other member 1 is a thumb strap 5. Connected to the inner sides of the members 1 are the contact pieces 6, said contact pieces conforming substantially in shape to the members 1 and being detachably secured to said members by means of suitable clips or clasps 7 in a manner to permit the ready removal of the contact pieces 6, so that when they become soiled, they may be removed and replaced by new ones.

In use the thumb of the hand is inserted under the strap 5, and the fingers of the same hand are inserted under the strap 3, and the two members are separated to catch a mosquito or fly between them and close them together to kill the insect.

A device made in accordance with my invention is simple in construction, is efficient in use, and can be produced at slight cost.

Having thus described the invention, what I claim is:

1. An insect destroyer comprising two members hinged together, detachable contact strips, clips for securing said strips to said members, and said members provided with straps for the fingers and thumb of the user.

2. An insect destroyer comprising two flat pieces of sheet material, hinges for connecting said pieces, a finger strap secured to one of said pieces, a thumb strap secured to the other piece, and contact strips secured to the inner faces of said pieces and detachable therefrom, substantially as described.

In testimony whereof, I affix my signature in presence of two witnesses.

ROBERT FYFE.

Witnesses:
 HENRY A. HAMILTON,
 HAROLD JOHNSON.